United States Patent
Sasayama

(10) Patent No.: US 12,480,880 B2
(45) Date of Patent: Nov. 25, 2025

(54) MICROSCOPIC RAMAN SPECTROSCOPY DEVICE

(71) Applicant: SHIMADZU CORPORATION, Kyoto (JP)

(72) Inventor: Tomoki Sasayama, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 58 days.

(21) Appl. No.: 18/294,858

(22) PCT Filed: Jun. 30, 2022

(86) PCT No.: PCT/JP2022/026204
§ 371 (c)(1),
(2) Date: Feb. 2, 2024

(87) PCT Pub. No.: WO2023/013325
PCT Pub. Date: Feb. 9, 2023

(65) Prior Publication Data
US 2024/0344990 A1    Oct. 17, 2024

(30) Foreign Application Priority Data

Aug. 4, 2021 (JP) ................. 2021-127928

(51) Int. Cl.
*G01J 3/44* (2006.01)
*G01J 3/02* (2006.01)
(Continued)

(52) U.S. Cl.
CPC ............ *G01N 21/65* (2013.01); *G01J 3/0208* (2013.01); *G01J 3/021* (2013.01); *G01J 3/0229* (2013.01);
(Continued)

(58) Field of Classification Search
CPC ........ G01N 21/65; G01J 3/0208; G01J 3/021; G01J 3/0229; G01J 3/18; G01J 3/4412;
(Continued)

(56) References Cited

U.S. PATENT DOCUMENTS 11,579,089 B2     2/2023  Aizawa et al.
2007/0171409 A1*  7/2007  Wang ................. G01N 21/6452
                                                          356/304
(Continued)

FOREIGN PATENT DOCUMENTS

CN    110926612 A      3/2020
JP    H11142240 A  *   5/1999
(Continued)

OTHER PUBLICATIONS

International Search Report for PCT/JP2022/026204 dated Sep. 13, 2022.
(Continued)

*Primary Examiner* — Abdullahi Nur
(74) *Attorney, Agent, or Firm* — Sughrue Mion, PLLC

(57) ABSTRACT

A microscopic Raman spectroscopy device includes laser oscillators (excitation light sources) that emit excitation laser lights (excitation lights) of different wavelengths, a spectrometer that uses a diffraction grating to disperse Raman scattering light emitted from a sample by irradiation with the excitation laser light from the laser oscillator, and a CCD detector that detects and photoelectrically converts the Raman scattering light dispersed by the spectrometer.
(Continued)

The spectrometer includes incident apertures, a plurality of (two) optical systems that guide the Raman scattering light incident from the incident aperture to the diffraction grating, and a plurality of light beams dispersed by the diffraction grating are incident on one imaging lens in tandem.

6 Claims, 3 Drawing Sheets

(51) Int. Cl.
  *G01J 3/18* (2006.01)
  *G01N 21/65* (2006.01)
  *G02B 21/16* (2006.01)
(52) U.S. Cl.
  CPC ............... *G01J 3/18* (2013.01); *G01J 3/4412* (2013.01); *G02B 21/16* (2013.01)
(58) Field of Classification Search
  CPC ...... G01J 2003/102; G01J 3/02; G01J 3/0294; G01J 3/06; G01J 3/2803; G01J 3/44; G02B 21/16
  See application file for complete search history.

(56) References Cited

U.S. PATENT DOCUMENTS

| | | |
|---|---|---|
| 2010/0007878 A1 | 1/2010 | Wolleschensky et al. |
| 2020/0348172 A1 | 11/2020 | Chen et al. |
| 2021/0190692 A1 | 6/2021 | Aizawa et al. |
| 2021/0215537 A1 | 7/2021 | Daugey et al. |

FOREIGN PATENT DOCUMENTS

| | | | |
|---|---|---|---|
| JP | 2006-113021 A | 4/2006 | |
| JP | 2012-3198 A | 1/2012 | |
| JP | 2017-207522 A | 11/2014 | |
| JP | 6788298 B1 | 11/2020 | |
| JP | 2021-96359 A | 6/2021 | |
| WO | WO-2014060466 A1 * | 4/2014 | ............ G01J 3/0272 |

OTHER PUBLICATIONS

Japanese Office Action dated Jul. 23, 2024 in Application No. 2023-539715.
Japanese Office Action dated May 14, 2024 in Application No. 2023-539715.
Extended European Search Report dated Jul. 14, 2025 in Application No. 22852751.1.

* cited by examiner (a) EXCITATION WAVELENGTH OF 532 nm (b) EXCITATION WAVELENGTH OF 785 nm

MICROSCOPIC RAMAN SPECTROSCOPY DEVICE

This Application is a National Stage of International Application No. PCT/JP2022/026204 filed Jun. 30, 2022, claiming priority based on Japanese Patent Application No. 2021-127928 filed Aug. 4, 2021.

TECHNICAL FIELD

The present invention relates to a microscopic Raman spectroscopy device that can obtain high spatial resolution on μm order by condensing excitation light using a microscope objective lens.

RELATED ART

When a substance (sample) is irradiated with light of a specific wavelength (monochromatic light, laser light, etc.), the irradiated light is scattered, and part of the irradiated light becomes weak Raman scattering light that is different in wavelength from the irradiated light due to molecular vibration. Since a frequency of this Raman scattering light matches a natural frequency of the molecule, the Raman scattering light appears at a certain wave number (Raman shift) based on the vibration and rotation of the molecule constituting the sample. A Raman spectroscopy device is a device that analyzes a molecular level structure of a sample by detecting a Raman spectrum obtained by spectroscopy of this Raman scattering light. This Raman spectroscopy device is composed of an excitation light source, a spectrometer and a detector, and various proposals have been made regarding this (for example, see Patent Document 1).

In addition, a proposal has been made for a microscopic Raman spectroscopy device that can obtain high spatial resolution on the μm order by concentrating irradiation light (excitation light) using a microscope objective lens in an optical system of a Raman spectroscopy device (For example, see Patent Document 2).

By the way, since the sample has fluorescence characteristics of various sizes with respect to ultraviolet rays and visible light, the sample emits fluorescence according to the irradiation light.

In Raman spectroscopy, when autofluorescence of a sample is strong, the wavelengths of the Raman scattering light and the fluorescence overlap, and the very weak Raman peak of the Raman spectrum is buried in the fluorescence spectrum. Therefore, a problem arises in that sample analysis cannot be performed with high accuracy.

Patent Document 3 proposes a micro Raman spectroscopy device that can analyze a sample with high accuracy by performing fluorescence observation as a preliminary measurement on the sample, predicting what wavelength of fluorescence the sample will emit in response to an excitation wavelength of laser light, and selecting an excitation laser light such that the wavelength of fluorescence and the wavelength of Raman scattering light do not overlap. Specifically, this micro Raman spectroscopy device includes a plurality of excitation laser light sources and an automatic laser switching machine for switching between these excitation laser light sources, and a spectrometer of the micro Raman spectroscopy device is provided with an aperture switching means for selecting an optimal aperture from among a plurality of apertures, a diffraction grating switching means for switching from among a plurality of diffraction gratings to an appropriate one according to the excitation laser light, a detector switching means for switching to an appropriate CCD detector from among a plurality of CCD detectors according to the excitation laser light, and the like.

PRIOR ART DOCUMENT

Patent Document

Patent Document 1: JP-A 2006-113021
Patent Document 2: JP-A 2017-207522
Patent Document 3: JP-B 6788298

SUMMARY OF THE INVENTION

Problem to be Solved by the Invention

However, in microscopic the Raman spectroscopy device proposed in Patent Document 3, the spectrometer is provided with the plurality of apertures (incidence apertures), the diffraction gratings and the CCD detectors (same number as the number of excitation laser light sources). In Patent Document 3, since a configuration is adopted in which these are switched by the aperture switching means, the diffraction grating switching means and the detector switching means for switching these according to the excitation laser lights with different wavelengths, there is a problem in that the structure of the spectrometer becomes complicated, leading to an increase in size and cost.

In addition, since each switching means for physically switching the aperture, diffraction grating and detector is provided with a movable part, problems such as position reproducibility of these movable parts may have a negative effect on sample analysis results.

The present invention has been made in view of the above-mentioned problems, and an object of the present invention is to provide a microscopic Raman spectroscopy device that can achieve downsizing and cost reduction by simplifying a structure of a spectrometer and can always analyze samples with high accuracy.

Means for Solving the Problem

A microscopic Raman spectroscopy device according to the present invention comprises a plurality of excitation light sources that each emit excitation of light different wavelengths, a spectrometer that uses diffraction gratings to disperse Raman scattering light emitted from a sample by irradiation with the excitation light from selected one of the excitation light sources and a detector that detects and photoelectrically converts the Raman scattering light dispersed by the spectrometer, wherein the spectrometer includes a plurality of incident apertures, optical systems that guide the Raman scattering light incident from the incident apertures to the diffraction gratings and an imaging lens that forms an image of a plurality of Raman scattering light beams dispersed by the diffraction gratings on the detector, and wherein the optical systems are provided in a number equal to the number of the incident apertures, and the imaging lens receives a plurality of light beams dispersed by the diffraction gratings and forms the image on the detector.

Effects of the Invention

According to the present invention, corresponding to a plurality of excitation light sources emitting excitation light with different wavelengths, the spectrometer is provided with the incident apertures provided in a number equal to the number of the plurality of the excitation light sources and a plurality of the optical systems (same number as the excitation light sources) that guide the Raman light incident from one of these incident apertures to a diffraction grating. Therefore, there is no need for a switching means to switch incident apertures (apertures) or diffraction gratings, and a plurality of light beams can be imaged on the detector using a single imaging lens. As a result, the structure of the spectrometer is simplified, making it possible to reduce the size and cost of the spectrometer.

Further, when an excitation light source, which emits excitation light with a wavelength that does not overlap with the wavelength of fluorescence emitted from the sample, is selected, in the spectrometer, an optical system corresponding to the selected excitation light source can be used to guide Raman scattering light to a corresponding diffraction grating. This prevents occurrence of problems such as the wavelengths of Raman scattering light and fluorescence overlapping each other, and the extremely weak Raman peak of the Raman spectrum being buried in the fluorescence spectrum. As a result, sample analysis can always be performed with high accuracy.

Furthermore, there is no need to physically switch between apertures, diffraction gratings and detectors, which were conventionally required. Therefore, problems such as position reproducibility of a movable portion of the switching means do not adversely affect analysis results of the sample, and this also allows analysis of the sample to be always performed with high accuracy.

FIG. is a diagram showing a Raman spectrum of 3 cyclohexane, in which (a) is a diagram when excited at an excitation wavelength of 532 nm and (b) is a diagram when excited at an excitation wavelength of 785 nm.

MODE FOR CARRYING OUT THE INVENTION

Embodiments of the present invention will be described below based on the accompanying drawings.

Figure 1:
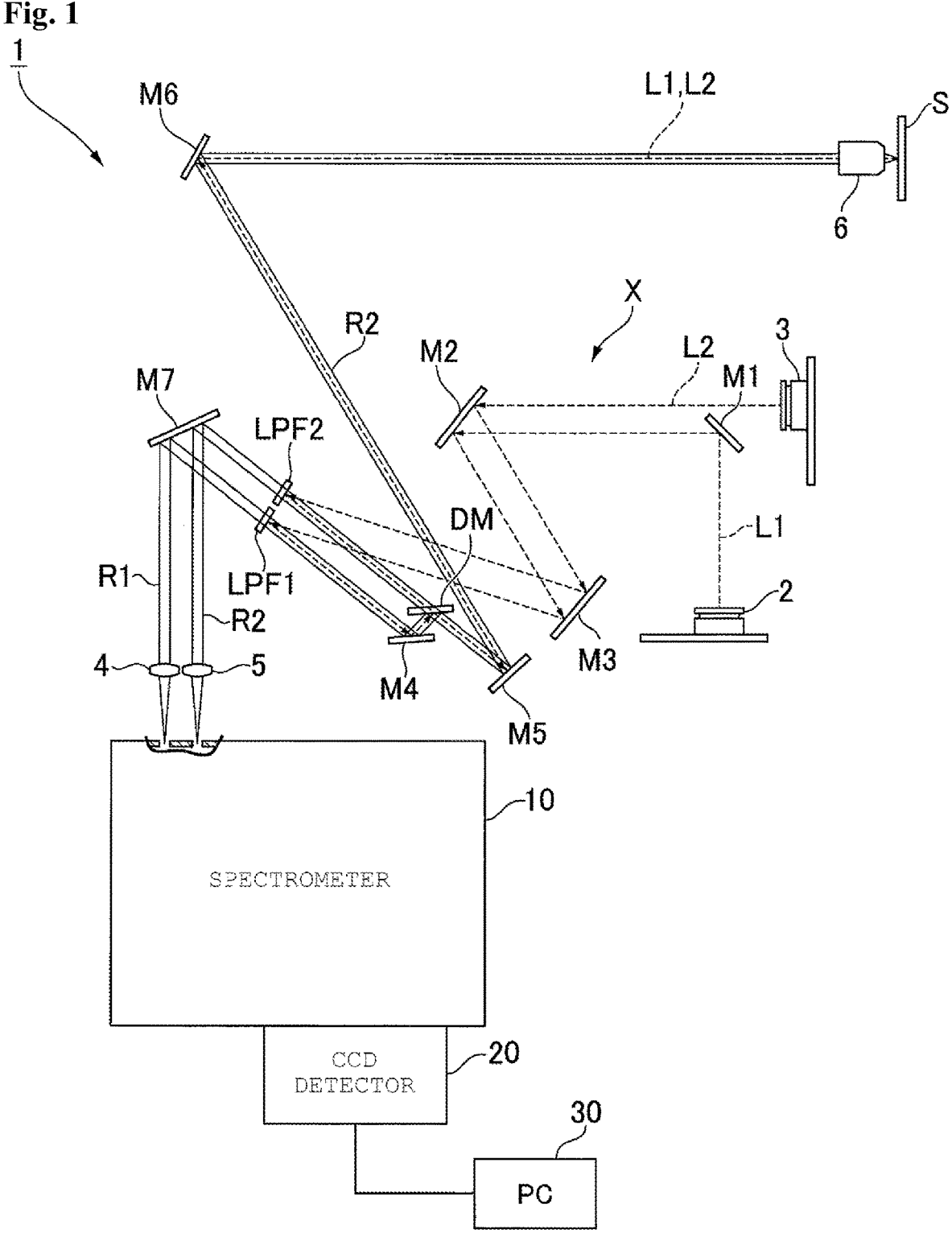
FIG. 1 is a diagram showing an overall configuration of a microscopic Raman spectroscopy device according to the present invention.

FIG. 1 is a diagram showing an overall configuration of a microscopic Raman spectroscopy device according to the present invention, and the illustrated microscopic Raman spectroscopy device 1 analyzes molecular structures, physical properties and the like of a sample S using a Raman spectrum obtained by dispersing weak Raman scattering light R1 or R2 emitted from the sample S irradiated with excitation laser light L1 or L2. The microscopic Raman spectroscopy device 1 is capable of local analysis on the several μm order by condensing the excitation laser light L1 or L2 with the objective lens 6 of the microscope and is configured as follows.

That is, the microscopic Raman spectroscopy device 1 shown in FIG. 1 basically includes two laser oscillators 2 and 3 as excitation light sources, a spectrometer 10 that disperses the Raman scattering light R1 or R2 emitted from the sample S by irradiation with the excitation laser light L1 or L2 from the selected one of the laser oscillators 2 and 3, a CCD detector 20 that detects the Raman scattering light dispersed by the spectrometer 10 for each wavelength (wavenumber) and converts it photoelectrically and a personal computer (PC) 30 that converts a signal obtained by the CCD detector 20 into a Raman shift value (wavenumber shift value) and displays it as a Raman spectrum. Further, this microscopic Raman spectroscopy device 1 is provided with an optical system X that irradiates the sample S with the excitation laser light L1 or L2 emitted from the selected one of the laser oscillators 2 and 3 and guides the weak Raman scattering light R1 or R2 emitted from the sample S to the spectrometer 10.

The two laser oscillators 2 and 3 each emit the excitation laser lights L1 and L2 with different wavelengths, and one laser oscillator 2 emits the excitation laser light L1 with a wavelength of 532 nm and the other laser oscillator 3 emits the excitation laser light L2 with a wavelength of 785 nm. The optical system X, which irradiates the sample S with the excitation laser light L1 or L2 emitted from these two the laser oscillators 2 and 3 respectively and guides the weak Raman scattering light R1 or R2 emitted from the sample S to the spectrometer 10, includes a plurality (seven) of reflection mirrors (plane mirrors) M1, M2, M3, M4, M5, M6 and M7, two long pass filters LPF1 and LPF2, one dichroic mirror DM, two condensing lenses 4 and 5 and one microscope objective lens 6.

Next, details of an internal configuration of the spectrometer 10 will be explained below based on FIG. 2.

Figure 2:
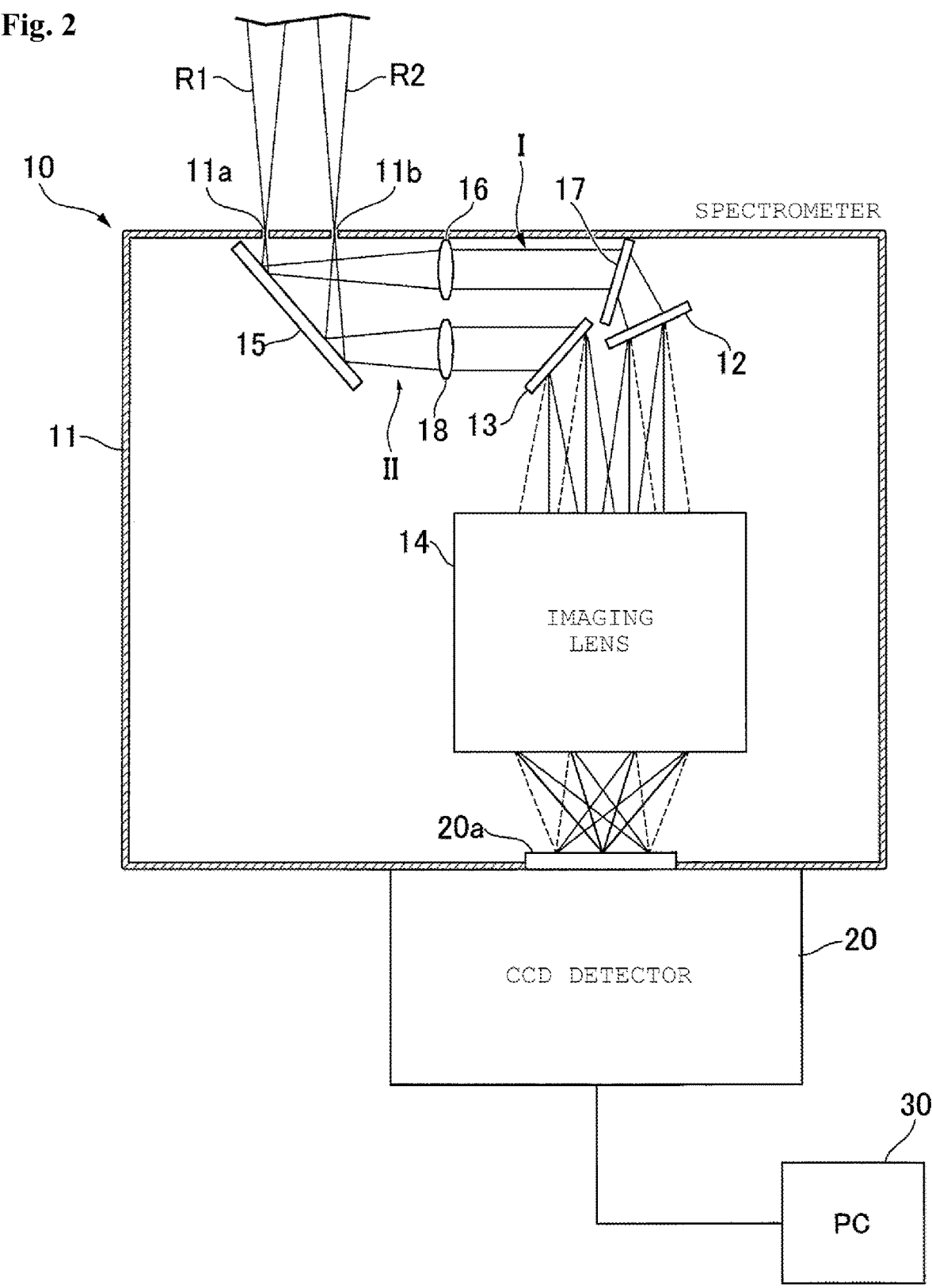
FIG. 2 is a cross-sectional view showing an internal configuration of a spectrometer of the microscopic Raman spectroscopy device according to the present invention.

FIG. 2 is a cross-sectional view showing an internal configuration of the spectrometer of the microscopic Raman spectroscopy device according to the present invention. The illustrated spectrometer 10 is configured by housing two (same number as the laser oscillators 2 and 3) diffraction gratings 12 and 13, one imaging lens 14 and two optical systems I and II that guide the Raman scattering light R1 or R2 incident from one of two (same number as the laser oscillators 2 and 3) incident apertures 11a and 11b formed on a top surface of a rectangular box-shaped case 11 to one of the diffraction gratings 12 and 13.

In this regard, one optical system I includes a reflection mirror 15, a collimator lens 16 and a diffraction grating 17, the other optical system II includes the reflection mirror 15 and a collimator lens 18, and the one reflection mirror 15 is shared by the optical systems I and II. By sharing the one reflection mirror 15 with the two optical systems I and II in this manner, the configuration of the spectrometer 10 can be simplified, making it possible to make the spectrometer 10 smaller and more compact and at lower cost. Further, only the one imaging lens 14 is provided, and as will be described later, the configuration is adopted in which the Raman scattering light R1 or R2 guided to the diffraction grating 12 or 13 and dispersed by the optical system I or II is condensed by the one common imaging lens 14 and imaged on a detection surface 20a of the CCD detector 20. This also simplifies the configuration of the spectrometer 10, making it possible to make the spectrometer 10 smaller, more compact and at lower cost.

Next, an action of the microscopic Raman spectroscopy device 1 configured as described above will be described.

In FIG. 1, for example, when the one laser oscillator 2 on the shorter wavelength side is selected and is driven (lit), this laser oscillator 2 emits the excitation laser light L1 with the wavelength of 532 nm, which is indicated by a broken line in FIG. 1. This excitation laser light L1 is sequentially reflected by the reflection mirrors M1, M2 and M3 and guided to the long pass filter LPF1, and then reflected by this long pass filter LPF1 and guided to the reflection mirror M4. After the excitation laser light L1 is reflected by this reflection mirror M4, the excitation laser light L1 is reflected by the dichroic mirror DM and reflection mirrors M5 and M6 and is irradiated toward the sample S. Here, the excitation laser light L1 with the wavelength of 532 nm directed toward the sample S is condensed by the objective lens 6, thereby making it possible to obtain a high spatial resolution on the μm order.

As described above, when the sample S is irradiated with the excitation laser light L1 with the wavelength of 532 nm emitted from the one laser oscillator 2, weak Raman scattering light R1 is emitted from the sample S, and as shown by a solid line in FIG. 1, this Raman scattering light R1 is sequentially reflected by the reflection mirrors M6 and M5, the dichroic mirror DM and the reflection mirror M4 and reaches the long pass filter LPF1. Then, this Raman scattering light R1 is transmitted through the long pass filter LPF1, reflected by the reflection mirror M7 and then condensed by the condensing lens 4, and is introduced into an interior of the spectrometer 10 through one of the incident aperture 11a opened in the case 11 of the spectrometer 10.

On the other hand, when the other laser oscillator 3 on the longer wavelength side is selected and is driven (lit), this laser oscillator 3 emits the excitation laser light L2 with the wavelength of 785 nm, which is indicated by a broken line in FIG. 1. Then, this excitation laser light L2 is sequentially reflected by the reflection mirrors M2 and M3 and guided to the long pass filter LPF2. Thereafter, the excitation laser light L2 is reflected by the long pass filter LPF2, passes through the dichroic mirror DM, reaches the reflection mirror M5, is sequentially reflected by the reflection mirrors M5 and M6, and is irradiated toward the sample S. Here, the excitation laser light L2 with the wavelength of 785 nm directed toward the sample S is focused by the objective lens 6, thereby making it possible to obtain a high spatial resolution on the μm order (in this embodiment, a diameter of 5 μm).

As described above, when the sample S is irradiated with the excitation laser light L2 with the wavelength of 785 nm emitted from the other laser oscillator 3, weak Raman scattering light R2 is emitted from the sample S, and as shown by a solid line in FIG. 1, this Raman scattering light R2 is sequentially reflected by the reflection mirrors M6 and M5 and then sequentially transmitted through the dichroic mirror DM and the long pass filter LPF2 to reach the reflection mirror M7. Then, this Raman scattering light R2 is reflected by the reflection mirror M7, then condensed by the condensing lens 5, and introduced into the interior of the spectrometer 10 through the other incident aperture 11b opened in the case 11 of the spectrometer 10. The two laser oscillators 2 and 3, which respectively emit the excitation laser lights L1 and L2 with different wavelengths, are selected to emit the excitation laser light L1 or L2 such that the wavelength of the fluorescence emitted from the sample S and the wavelength of the Raman scattering light R1 or R2 do not overlap, and the selected laser oscillator 2 or 3 is selectively driven (lit).

When the Raman scattering light R1 or R2 is condensed by the incident aperture 11a or 11b and introduced into the spectroscope 10 as described above, the Raman scattering light R1 or R2 is guided to the diffraction grating 12 or 13 by the optical system I or II shown in FIG. 2 provided in the spectrometer 10 and is dispersed into wavelengths.

That is, as shown in FIG. 2, when the one Raman scattering light R1 that has passed through one incident aperture 11a is introduced into the case 11 of the spectrometer 10, this Raman scattering light R1 is reflected by the reflection mirror 15 constituting the optical system I and then transmitted through the collimator lens 16 to be collimated into a parallel light beam. A direction of this parallel light beam is changed by the diffraction grating 17 and guided to the diffraction grating 12 and is dispersed into wavelengths by passing through the diffraction grating 12.

On the other hand, when the other Raman scattering light R2 that is condensed by passing through the other incident aperture 11b is introduced into the case 11 of the spectrometer 10, this Raman scattering light R2 is reflected by the common reflecting mirror 15 constituting the optical system II and then transmitted through the collimator lens 18 to be collimated into a parallel light beam. This parallel light beam is guided to the diffraction grating 13 and is dispersed into wavelengths by passing through the diffraction grating 13.

By the way, in this embodiment, while achieving a spatial resolution of 5 μm in diameter on the sample S, the wavelength resolution of the spectrometer 10 is selected to be approximately 0.3 μm in balance with the minimum required value and the desired energy. In this embodiment, the diameter of the incident apertures 11a and 11b, which corresponds to the wavelength resolution of 0.3 μm, is approximately 30 μm. Therefore, in order to make the Raman scattering lights R1 and R2 from a 5 μm diameter area of the sample S enter the incident apertures 11a and 11b, respectively, diameters of the Raman scattering lights R1 and R2 emitted from the sample S may be expanded approximately six times and then imaged onto the incident apertures 11a and 11b. Therefore, an F value of the Raman scattering lights R1 and R2 that enter the spectrometer 10 does not need to be very small (there is no need to make a bright light beam enter).

As described above, when the Raman scattering light R1 or R2 is dispersed by the diffraction grating 12 or 13, the dispersed Raman scattering light R1 or R2 is imaged on the detection surface 20a of the CCD detector 20 by the imaging lens 14. Then, the CCD detector 20 detects the dispersed Raman scattering light R1 or R2 for each wavelength (wavenumber) and photoelectrically converts it, and the signal obtained by this CCD detector 20 is converted into the Raman shift value (wavenumber shift value) by the personal computer (PC) 30 and displayed as the Raman spectrum.

By the way, in this embodiment, the F value of the Raman scattering lights R1 and R2 incident on the spectrometer 10 is about 6. Considering that this F value is 6/2.3=2.6 times the F value of 2.3 in a general bright Raman spectroscopy device, the parallel light beams of the Raman scattering lights R1 and R2 can be small as 1/2.6≈0.38, which is about a little less than 40%. Therefore, the Raman scattering lights R1 and R2 can be incident on the one imaging lens 14 in tandem, and the diameter of the imaging lens 14 can be kept small to make the imaging lens 14 smaller and more compact, so that the entire spectrometer 10 can be made smaller and more compact.

Figure 3:
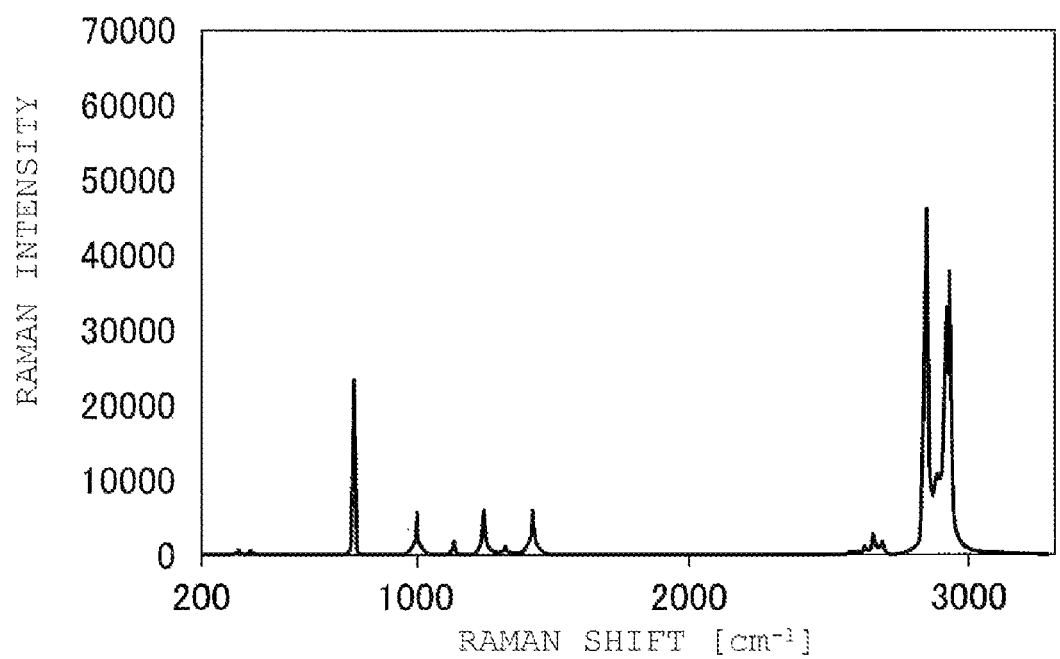
Figure 3:
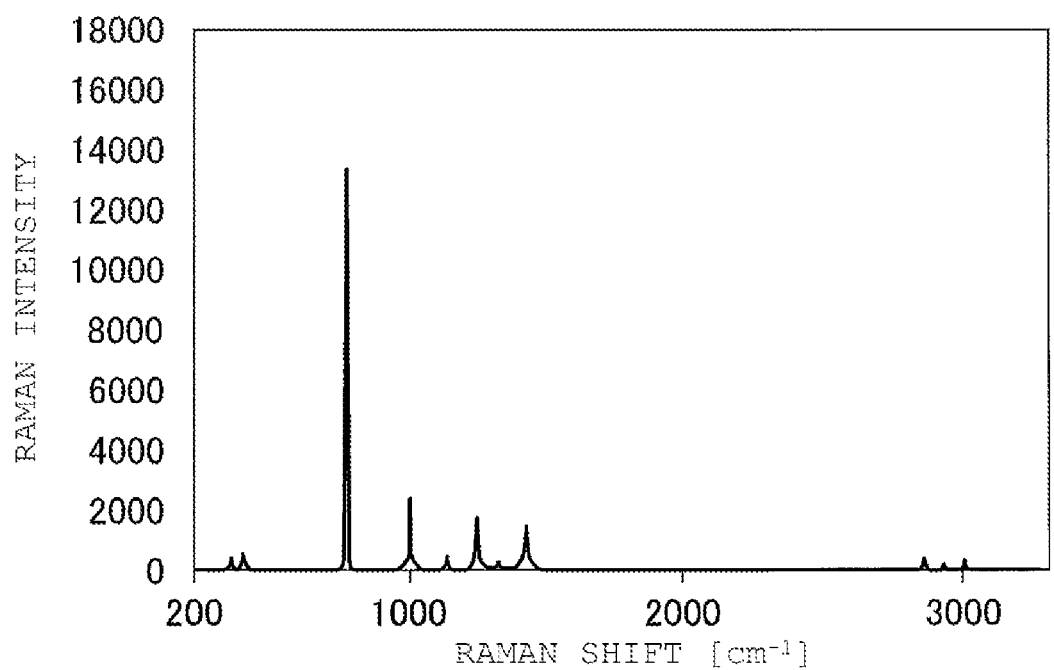

Here, an example of the Raman spectrum is shown in FIG. 3.

FIG. 3 is a diagram showing a Raman spectrum of cyclohexane, in which (a) is a diagram when excited at an excitation wavelength of 532 nm and (b) is a diagram when excited at an excitation wavelength of 785 nm. Note that a horizontal axis of the Raman spectra shown in FIG. 3 at (a) and (b) is the Raman shift ($cm^{-1}$) and a vertical axis is the Raman intensity.

As is clear from FIG. 3 at (a) and (b), the peak of Raman intensity appears at the same Raman shift (wave number) in both cases of excitation at the excitation wavelength of 532 nm and excitation at the excitation wavelength of 785 nm, but the intensity ratio varies depending on the excitation wavelength and the excitation at the excitation wavelength of 785 nm exhibits a higher intensity peak value than the excitation at the excitation wavelength of 532 nm.

As is clear from the above description, according to the microscopic Raman spectroscopy device 1 according to the present embodiment, corresponding to two laser oscillators 2 and 3 that emit the excitation laser light with different wavelengths, the spectrometer 10 is provided with the two incident apertures 11a and 11b provided in a number equal to the number of the two laser oscillators 2 and 3 and a plurality of the optical systems I and II (same number as the laser oscillators 2 and 3) that guide the Raman scattering light R1 or R2 incident from one of these incident apertures 11a and 11b to the diffraction grating 12 or 13. Therefore, there is no need for a switching means to switch the incident apertures 11a and 11b or the diffraction gratings 12 and 13, so that the structure of the spectrometer 10 is simplified, making it possible to reduce the size and cost of the spectrometer 10.

Further, when the laser oscillator 2 or 3, which emits the excitation laser light L1 or L2 with the wavelength that does not overlap with the wavelength of fluorescence emitted from the sample S, is selected, in the spectrometer 10, the optical system I or II corresponding to the selected laser oscillator 2 or 3 can be used to guide Raman scattering light R1 or R2 to the corresponding diffraction grating 12 or 13. This prevents occurrence of problems such as the wavelengths of the Raman scattering light R1 or R2 and fluorescence overlapping each other, and the extremely weak Raman peak of the Raman spectrum being buried in the fluorescence spectrum. As a result, sample analysis can always be performed with high accuracy.

Furthermore, since each means switching for physically switching the incident apertures 11a and 11b, the diffraction gratings 12 and 13 and the CCD detector 20, which were conventionally required, is no longer required, problems such as position reproducibility of the movable part of the switching means will not adversely affect the analysis results of the sample S. This also makes it possible to always analyze the sample S with high accuracy.

Note that in the above embodiment, the present invention is applied to the microscopic Raman spectroscopy device 1 that includes the two laser oscillators 2 and 3 that emit the excitation laser lights L1 and L2 with different wavelengths, respectively, but the present invention is similarly applicable to a microscopic Raman spectroscopy device including three or more laser oscillators that emit excitation laser lights with different wavelengths.

Further, in the above embodiment, the excitation laser light L1 with the wavelength of 532 nm and the excitation laser light L2 with the wavelength of 785 nm have been described as an example of the excitation laser lights with different wavelengths, but the wavelength of the laser light may be any other arbitrary wavelength (For example, 488 nm, 633 nm, or the like) can be selected.

Furthermore, as the excitation light source, in addition to a laser oscillator that emits excitation laser other excitation light source light, any that emits monochromatic light other than laser light can be used.

In addition, the present invention is not limited to the embodiment described above, and various modifications can be made within the scope of the technical ideas described in the claims, specification and drawings.

DESCRIPTION OF REFERENCES

1: Microscopic Raman spectroscopy device
2, 3: Laser oscillator (excitation light source)
4, 5: Condensing lens
6: Objective lens
10: Spectrometer
11: Spectrometer case
11a, 11b: incident aperture
12, 13, 17: Diffraction grating
14: Imaging lens
15: Reflection mirror
16, 18: Collimator lens
20: CCD detector (detector)
20a: Detection surface of CCD detector
30: Personal computer (PC)
I,II: Optical system
DM: Dichroic mirror
L1, L2: Excitation laser light (excitation light)
M1-M7: Reflection mirror
R1, R2: Raman scattering light
S: Sample
X: Optical system

What is claimed is:

1. A microscopic Raman spectroscopy device comprising:
a plurality of excitation light sources that each emit excitation light of different wavelengths;
a spectrometer that uses diffraction gratings to disperse Raman scattering light emitted from a sample by irradiation with the excitation light from selected one of the excitation light sources; and
a detector that detects and photoelectrically converts the Raman scattering light dispersed by the spectrometer,
wherein the spectrometer includes a plurality of incident apertures, optical systems that guide the Raman scattering light incident from the incident apertures to the diffraction gratings and an imaging lens that forms an image of a plurality of Raman scattering light beams dispersed by the diffraction gratings on the detector,
wherein the optical systems are provided in a number equal to the number of the incident apertures, and
wherein the imaging lens receives the plurality of Raman scattering light beams dispersed by the diffraction gratings and forms the image on the detector.

2. The microscopic Raman spectroscopy device as claimed in claim 1, wherein the incident apertures, the optical systems and the diffraction gratings are provided in the same number as the excitation light sources.

3. The microscopic Raman spectroscopy device as claimed in claim 1, wherein the Raman scattering light beams condensed by the imaging lens is imaged on a detection surface of the common detector.

4. The microscopic Raman spectroscopy device as claimed in claim 1, wherein each of the optical systems includes a reflection mirror that reflects the Raman scattering light incident from the incident aperture and a collimator lens that collimates the Raman scattering light reflected by the reflection mirror and guides it to each of the diffraction gratings.

5. The microscopic Raman spectroscopy device as claimed in claim 4, wherein the reflection mirror is shared by the plurality of optical systems.

6. The microscopic Raman spectroscopy device as claimed in claim 1, wherein the excitation light sources include a laser oscillator that emits excitation laser light with a wavelength of 532 nm and a laser oscillator that emits excitation laser light with a wavelength of 785 nm.

* * * * *